United States Patent
Megherhi et al.

(10) Patent No.: US 10,544,332 B2
(45) Date of Patent: Jan. 28, 2020

(54) SLURRY COMPOSITION AND METHOD OF USE

(71) Applicant: Ferro Corporation, Mayfield Heights, OH (US)

(72) Inventors: Mohammed H. Megherhi, Victor, NY (US); Nathaniel D. Urban, Canandaigua, NY (US); Yie Shein Her, Canandaigua, NY (US)

(73) Assignee: Ferro Corporation, Mayfield Heights, OH (US)

( * ) Notice: Subject to any disclaimer, the term of this patent is extended or adjusted under 35 U.S.C. 154(b) by 416 days.

(21) Appl. No.: 15/320,910

(22) PCT Filed: Jul. 18, 2016

(86) PCT No.: PCT/US2016/042707
§ 371 (c)(1),
(2) Date: Dec. 21, 2016

(87) PCT Pub. No.: WO2017/030710
PCT Pub. Date: Feb. 23, 2017

(65) Prior Publication Data
US 2017/0204293 A1 Jul. 20, 2017

Related U.S. Application Data

(60) Provisional application No. 62/206,972, filed on Aug. 19, 2015.

(51) Int. Cl.
| | |
|---|---|
| *B24B 1/00* | (2006.01) |
| *C09G 1/02* | (2006.01) |
| *B24B 37/20* | (2012.01) |
| *B24B 37/34* | (2012.01) |
| *C09K 3/14* | (2006.01) |

(52) U.S. Cl.
CPC ............... *C09G 1/02* (2013.01); *B24B 37/20* (2013.01); *B24B 37/34* (2013.01); *C09K 3/1409* (2013.01)

(58) Field of Classification Search
CPC ............... B24B 1/00; C09G 1/04; C09G 1/02
USPC .................... 451/37, 41; 252/79.5, 79.1
See application file for complete search history.

(56) References Cited

U.S. PATENT DOCUMENTS

| | | | |
|---|---|---|---|
| 6,491,843 B1 | 12/2002 | Srinivasan et al. | |
| 6,596,042 B1 | 7/2003 | Feng et al. | |
| 6,616,514 B1 | 9/2003 | Edelbach et al. | |
| 6,660,639 B2 | 12/2003 | Li et al. | |
| 6,702,954 B1 | 3/2004 | Her et al. | |
| 6,818,030 B2 | 11/2004 | Feng et al. | |
| 7,091,164 B2 | 8/2006 | Srinivasan et al. | |
| 7,101,800 B2 | 9/2006 | Her et al. | |
| 7,300,478 B2 | 11/2007 | Ferranti et al. | |
| 7,666,239 B2 | 2/2010 | Feng et al. | |
| 7,696,095 B2 | 4/2010 | Oswald et al. | |
| 8,409,990 B2 | 4/2013 | Kraft | |
| 8,697,576 B2 | 4/2014 | Reiss et al. | |
| 8,821,215 B2 | 9/2014 | Naguib Sant | |
| 9,129,907 B2 | 9/2015 | White et al. | |
| 9,416,297 B2 | 8/2016 | Hsu et al. | |
| 9,422,455 B2 | 8/2016 | Pallikkara Kuttiatoor et al. | |
| 9,662,763 B2 * | 5/2017 | Asano | B24B 37/044 |
| 2011/0258938 A1 | 10/2011 | Morinaga et al. | |
| 2013/0037515 A1 * | 2/2013 | Hosoi | C09G 1/02 216/53 |
| 2013/0324015 A1 | 12/2013 | Asano et al. | |

FOREIGN PATENT DOCUMENTS

CN   104559798   4/2015

OTHER PUBLICATIONS

Espacenet bibliographic data for CN104559798 published Apr. 29, 2015, one page.
International Search Report for corresponding PCT/US2016/042707 dated Oct. 27, 2016, one page.

* cited by examiner

*Primary Examiner* — Robert A Rose
(74) *Attorney, Agent, or Firm* — Rankin, Hill & Clark LLP

(57) ABSTRACT

A slurry composition for use in chemical-mechanical polishing sapphire substrates and includes an alkaline pH adjuster and an accelerant.

19 Claims, No Drawings

SLURRY COMPOSITION AND METHOD OF USE

FIELD OF INVENTION

The present invention relates to a slurry composition for use in chemical-mechanical polishing sapphire substrates and a method of using the slurry composition.

DESCRIPTION OF RELATED ART

The sapphire substrates described in this invention are made from single crystal alumina with very high purity level and are used for applications in LED lighting and cover glass on smart phones and tablets. A variety of slurry compositions are known in the art for use in chemical-mechanical polishing of sapphire substrates. Such prior art slurry compositions generally consist of abrasive particles dispersed in deionized water and/or other liquids. Commonly utilized abrasive particles include, for example, silicon dioxide (silica) and aluminum oxide (alumina). Silica is the most commonly used abrasive to polish sapphire substrates with high surface quality. Alumina based slurries, on the other hand, result in much higher removal rate, but with lower surface quality than silica.

As industry continues to seek improvement in production throughput in order to become more cost effective, increased removal rate using aforementioned abrasives while achieving high surface quality became highly desirable.

BRIEF SUMMARY OF THE INVENTION

The present invention provides a method to increase the polish rate of sapphire wafers. The method involves an alkaline alumina slurry together with a polishing accelerant which includes a cationic organic compound. The present invention provides an aqueous polishing slurry composition that comprises deionized water, alumina particles, a strong alkaline pH adjuster, and an agent that accelerates the polishing rate of sapphire substrates. The alkaline pH adjuster may be a hydroxide, for example any of the following: sodium hydroxide, potassium hydroxide, lithium hydroxide, and cesium hydroxide. Combinations of the foregoing are also envisioned. The agent that accelerates removal rate of sapphire substrates is a cationic organic compound. The cationic compound includes a central atom with a positive charge attached to four organic-based pendant groups. Non-limiting examples of central atoms include nitrogen (ammonium) and phosphorous (phosphonium). There is no limit to the molecular weight of the compound. The compound can be polymeric or oligomeric in nature or include low molecular weight species. The compound can include one cationic site or multiple sites with no limitation. There is no limitation to the length or structure of the pendant groups. The positively charged (cationic) central atom is balanced with a negatively charged anion. There is no limitation to the negatively charged anion. Typical but not limiting anions include hydroxide, chloride, bromide, iodide, nitrate, sulfate, and phosphate.

The slurry composition according to this invention can be used to polish sapphire at a high removal rate. The present invention also provides a method of polishing a sapphire substrate using the slurry composition.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a method to increase the polish rate of sapphire wafers. The method involves an alkaline alumina slurry together with a polishing accelerant including a cationic organic compound. The present invention provides an aqueous polishing slurry composition that comprises deionized water, alumina particles, a strong alkaline pH adjuster, and an agent that accelerates the polishing rate of sapphire substrates. The alkaline pH adjuster may be a hydroxide, for example any of the following: sodium hydroxide, potassium hydroxide, lithium hydroxide, and cesium hydroxide. The agent that accelerates removal rate of sapphire substrates is a cationic organic compound. The cationic compound includes of a central atom with a positive charge attached to four organic-based pendant groups. Non-limiting central atoms include nitrogen (ammonium) and phosphorous (phosphonium). There is no limit to the molecular weight of the compound. The compound can be polymeric or oligomeric in nature and low molecular weight species are also contemplated. The compound can include one cationic site or multiple sites with no limitation. There is no limitation to the length or structure of the pendant groups. The positively charged (cationic) central atom is balanced with a negatively charged anion. There is no limitation to the negatively charged anion. Typical anions include but are not limited to hydroxide, chloride, bromide, iodide, nitrate, sulfate, phosphate, and combinations thereof. Each of the components of the slurry composition is separately discussed below.

Alumina Particles

The slurry composition preferably comprises from about 1% to about 30% by weight, and more preferably from about 4% to about 7% by weight, of alumina particles.

The alumina particles can include different crystal phases including alpha crystal phase, gamma crystal phase, delta crystal phase, theta crystal phase, and a combination of these. For sapphire polishing, alumina particles containing at least 70%, preferably at least 80% and more preferably at least 90% alpha crystal phase is preferred due to its high polish rate.

The alumina particles used in the slurry composition according to the invention preferably have an average particle size ($D_{50}$) of from about 0.02 μm to about 7.0 μm. More preferably, the alumina particles have an average particle size ($D_{50}$) within the range of from about 0.10 μm to about 4.0 μm.

Alkaline pH Adjuster

The preferred alkaline pH adjuster in this invention consists of one or more selected from sodium hydroxide, potassium hydroxide, lithium hydroxide, and cesium hydroxide. Other pH adjusters are acceptable as long as the pH of the slurry can be effectively adjusted to the range from 10.5 to 13.0, preferably 12-12.5. Strong, effective, alkaline pH adjusters are preferred in order to adjust the slurry pH value to the range from about 10.5 to about 13 for improved polishing performance.

Polishing Accelerants

The slurry composition preferably comprises one or more accelerants in an amount within the range of from about 0.1 to about 30%, preferably about 0.5 to about 25% by weight of the total solids present in the slurry composition. More preferably, slurry composition preferably comprises one or more accelerants in an amount within the range of from about 1% to about 15% by weight of the total solids present in the slurry composition.

Suitable accelerants for use to improve the polishing rate in this invention are cationic organic compounds. The cationic compound consists of a central atom with a positive charge attached to four organic-based pendant groups. Non-limiting examples of central atoms include nitrogen and phosphorous. There is no limit to the molecular weight of the compound. The compound can be polymeric or oligomeric in nature or include low molecular weight species. The compound can include one cationic site or multiple sites with no limitation. There is no limitation to the length or structure of the pendant groups. The positively charged (cationic) central atom is balanced with a negatively charged anion. There is no limitation to the negatively charged anion. Typical but not limiting anions include hydroxide, chloride, bromide, iodide, nitrate, sulfate, and phosphate.

Examples of these cationic compounds include but are not limited to tetramethylammonium hydroxide, tetraethylammonium hydroxide, tetrabutylammonium hydroxide, tetrabutylammonium bromide, cetyl trimethylammonium bromide (CTAB), cetyl trimethylammonium chloride (CTAC), benzalkonium chloride, poly(2-methacryloyloxyethyltrimethyl ammonium chloride), tetramethylphosphonium chloride, hydroxyethyl cellulose dimethyl diallylammonium chloride copolymer (Polyquaternium-4), poly(2-methacryloxyethyltrimethyl ammonium chloride), cationic guar, or any combination of the foregoing.

The present invention provides a way to increase the polish rate of sapphire when polishing with an alkaline alumina slurry by adding to the slurry a polishing accelerant comprising a cationic organic compound. The cationic compound consists of a central atom with a positive charge attached to four organic-based pendant groups. Non-limiting central atoms include nitrogen and phosphorous. There is no limit to the molecular weight of the compound. The compound can be polymeric or oligomeric in nature or include low molecular weight species. The compound can include one cationic site or multiple sites with no limitation. There is no limitation to the length or structure of the pendant groups. The positively charged (cationic) central atom is balanced with a negatively charged anion. There is no limitation to the negatively charged anion. Typical but not limiting anions include hydroxide, chloride, bromide, iodide, nitrate, sulfate, and phosphate.

The method according to the present invention comprises introducing a slurry composition between a polishing pad and a sapphire substrate that are pressed into contact and moving relative to each other, wherein the slurry composition comprises deionized water, alumina particles, an alkaline pH adjuster, and one or more polishing accelerant agents described above. The method of the invention can be used to planarize sapphire substrates used for applications in LED lighting and cover glass on smart phones and tablets.

Example 1

Table 1 shows the polish rates of 2-inch diameter sapphire wafers using slurries containing 7 wt % aluminas with and without the presence of 0.5 wt % tetramethylammonium hydroxide. The particle size $D_{50}$ of the alumina particles in both slurry compositions is 0.38 micron. It can be seen that the presence of tetramethylammonium hydroxide significantly increases the sapphire polish rate of alkaline alumina slurry at pH=12.5 by about 20%.

TABLE 1

Polish rates of 2-inch diameter sapphire wafers polished using 7 wt % alumina slurries. Polishing is performed using a PR Hoffman double-sided polisher operated at 50 rpm top platen speed and 5 psi polishing pressure. Polishing pad is Suba 600 grooved pad.

| Slurry Composition | Polish Rate (mg/hour) | Polished Surface Roughness by AFM, Ra (Å) |
|---|---|---|
| 7 wt % alumina, pH adjusted to 12.5 using KOH | 36 | 1.9 |
| 7 wt % alumina + 0.5 wt% tetramethylammonium hydroxide, pH adjusted to 12.5 using KOH | 43 | 1.7 |

Example 2

Table 2 shows the polish rates of 2-inch diameter sapphire wafers using slurries containing 7 wt % aluminas with and without the presence of 0.28 wt % hydroxyethyl cellulose dimethyl diallylammonium chloride copolymer (polyquaternium-4). The particle size $D_{50}$ of the alumina particles in both slurry compositions is 0.33 micron. It can be seen that the presence of hydroxyethyl cellulose dimethyl diallylammonium chloride copolymer (polyquaternium-4) significantly increases the sapphire polish rate of alkaline alumina slurry at pH=12.5 by about 18%.

TABLE 2

Polish rates of 2-inch diameter sapphire wafers polished using 7 wt % alumina slurries. Polishing is performed using a PR Hoffman double-sided polisher operated at 45 rpm top platen speed and 5 psi polishing pressure. Polishing pad is Suba 600 grooved pad.

| Slurry Composition | Polish Rate (mg/hour) | Polished Surface Roughness by AFM, Ra (Å) |
|---|---|---|
| 7 wt % alumina, pH adjusted to 12.5 using KOH | 28 | 1.6 |
| 7 wt % alumina + 0.28 wt% polyquaternium-4, pH adjusted to 12.5 using KOH | 33 | 1.6 |

The invention is further described with reference to the following items.

Item 1. An aqueous slurry composition comprising:
alumina particles;
an alkaline pH adjuster selected from the group consisting of sodium hydroxide, potassium hydroxide, lithium hydroxide, cesium hydroxide, and combinations thereof; and
a cationic organic polishing accelerant including at least one central atom with a positive charge attached to four organic-based pendant groups and balanced with a negatively charge anion.

Item 2. The aqueous slurry composition according to item 1, wherein the central atom is nitrogen or phosphorous.

Item 3. The aqueous slurry composition according to item 1, wherein the negatively charged anion is selected from the group consisting of hydroxide, chloride, bromide, iodide, nitrate, sulfate, phosphate and combinations thereof.

Item 4. The aqueous slurry composition according to item 1, wherein the cationic organic polishing accelerant is one or more selected from tetramethylammonium hydroxide, tetraethylammonium hydroxide, tetrabutylammonium hydroxide, tetrabutylammonium bromide, cetyl trimethylammonium bromide (CTAB), cetyl trimethylammonium chloride (CTAC), benzalkonium chloride, poly(2-methacryloyloxyethyltrimethyl ammonium chloride), tetramethylphosphonium chloride, hydroxyethyl cellulose dimethyl diallylammonium chloride copolymer (Polyquaternium-4), poly(2-methacryloxyethyltrimethyl ammonium chloride), and cationic guar.

Item 5. The aqueous slurry composition according to item 1, wherein the alumina particles have an average particle size ($D_{50}$) of from about 0.02 μm to about 7.0 μm.

Item 6. The aqueous slurry composition according to item 1, wherein the alkaline pH adjuster is potassium hydroxide.

Item 7. The aqueous slurry composition according to any of items 1-6, wherein the pH value of the slurry is in the range of 10 to 13, preferably 12 to 12.5.

Item 8. A method of polishing sapphire substrate comprising introducing an aqueous slurry composition between a polishing pad and the substrate when the polishing pad and substrate are pressed into contact with each other and moving relative to each other, wherein the aqueous slurry composition comprises:
  alumina particles; and
  a cationic organic polishing accelerant consisting of at least one central atom with a positive charge attached to four organic-based pendant groups and balanced with a negatively charge anion.

Item 9. The method of item 8, wherein the central atom is nitrogen or phosphorous.

Item 10. The method of item 8, wherein the negatively charged anion is selected from hydroxide, chloride, bromide, iodide, nitrate, sulfate, and phosphate.

Item 11. The method of item 8, wherein the cationic organic polishing accelerant is selected from the group consisting of tetramethylammonium hydroxide, tetraethylammonium hydroxide, tetrabutylammonium hydroxide, tetrabutylammonium bromide, cetyl trimethylammonium bromide (CTAB), cetyl trimethylammonium chloride (CTAC), benzalkonium chloride, poly (2-methacryloyloxyethyltrimethyl ammonium chloride), tetramethylphosphonium chloride, hydroxyethyl cellulose dimethyl diallylammonium chloride copolymer (Polyquaternium-4), poly(2-methacryloxyethyltrimethyl ammonium chloride), and cationic guar, and combinations thereof.

Item 12. The method of item 8, wherein the alumina particles have an average particle size ($D_{50}$) of from about 0.02 μm to about 7.0 μm.

Item 13. The method of item 8, wherein the slurry composition further comprises an alkaline pH adjuster consisting of one or more selected from sodium hydroxide, potassium hydroxide, lithium hydroxide, and cesium hydroxide.

Item 14. The method of item 13, wherein the alkaline pH adjuster is potassium hydroxide.

Item 15. The method of any of items 8-14, wherein the pH value of the slurry is in the range of 10 to 13, preferably 12 to 12.5.

Item 16. A sapphire substrate polished by the aqueous slurry composition of any of items 1 to 7.

Item 17. A sapphire substrate polished by the method of any of items 8 to 15.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

The invention claimed is:

1. An aqueous slurry composition comprising:
  alumina particles;
  an alkaline pH adjuster selected from the group consisting of sodium hydroxide, potassium hydroxide, lithium hydroxide, cesium hydroxide, and combinations thereof; and
  a cationic organic polishing accelerant including at least one central atom with a positive charge attached to four organic-based pendant groups and balanced with a negatively charged anion;
  wherein a pH value of the slurry is in the range of 12 to 13.

2. The aqueous slurry composition according to claim 1, wherein the central atom is nitrogen or phosphorous.

3. The aqueous slurry composition according to claim 1, wherein the negatively charged anion is selected from the group consisting of hydroxide, chloride, bromide, iodide, nitrate, sulfate, phosphate and combinations thereof.

4. The aqueous slurry composition according to claim 1, wherein the cationic organic polishing accelerant is one or more selected from tetramethylammonium hydroxide, tetraethylammonium hydroxide, tetrabutylammonium hydroxide, tetrabutylammonium bromide, cetyl trimethylammonium bromide (CTAB), cetyl trimethylammonium chloride (CTAC), benzalkonium chloride, poly(2-methacryloyloxyethyltrimethyl ammonium chloride), tetramethylphosphonium chloride, hydroxyethyl cellulose dimethyl diallylammonium chloride copolymer (Polyquaternium-4), poly(2-methacryloxyethyltrimethyl ammonium chloride), and cationic guar.

5. The aqueous slurry composition according to claim 1, wherein the alumina particles have an average particle size ($D_{50}$) of from about 0.02 μm to about 7.0 μm.

6. The aqueous slurry composition according to claim 1, wherein the alkaline pH adjuster is potassium hydroxide.

7. The aqueous slurry composition according to claim 1, wherein a pH value of the slurry is in the range of 12 to 12.5.

8. The aqueous slurry composition according to claim 1, wherein the alumina particles include at least 70% alpha crystal phase.

9. A method of polishing a sapphire substrate comprising introducing an aqueous slurry composition between a polishing pad and the substrate when the polishing pad and substrate are pressed into contact with each other and moving relative to each other, wherein the aqueous slurry composition comprises:
  alumina particles; and
  a cationic organic polishing accelerant including at least one central atom with a positive charge attached to four organic-based pendant groups and balanced with a negatively charge anion;
  wherein a pH value of the slurry is in the range of 12 to 13.

10. The method of claim 9, wherein the central atom is nitrogen or phosphorous.

11. The method of claim 9, wherein the negatively charged anion is selected from hydroxide, chloride, bromide, iodide, nitrate, sulfate, and phosphate.

12. The method of claim 9, wherein the cationic organic polishing accelerant is selected from the group consisting of tetramethylammonium hydroxide, tetraethylammonium hydroxide, tetrabutylammonium hydroxide, tetrabutylammonium bromide, cetyl trimethylammonium bromide (CTAB), cetyl trimethylammonium chloride (CTAC), benzalkonium chloride, poly (2-methacryloyloxyethyltrimethyl ammonium chloride), tetramethylphosphonium chloride, hydroxyethyl cellulose dimethyl diallylammonium chloride copolymer (Polyquaternium-4), poly(2-methacryloxyethyl-trimethyl ammonium chloride), and cationic guar, and combinations thereof.

13. The method of claim 9, wherein the alumina particles have an average particle size ($D_{50}$) of from about 0.02 km to about 7.0 μm.

14. The method of claim 9, wherein the slurry composition further comprises an alkaline pH adjuster consisting of one or more selected from sodium hydroxide, potassium hydroxide, lithium hydroxide, and cesium hydroxide.

15. The method of claim 14, wherein the alkaline pH adjuster is potassium hydroxide.

16. The method of claim 9, wherein a pH value of the slurry is in the range of 12 to 12.5.

17. The method of claim 9, wherein the alumina particles include at least 70% alpha crystal phase.

18. A sapphire substrate polished by the aqueous slurry composition of claim 1.

19. A sapphire substrate polished by the method of claim 9.

* * * * *